(12) United States Patent
Kuo et al.

(10) Patent No.: US 8,571,246 B2
(45) Date of Patent: Oct. 29, 2013

(54) WIRELESS COMMUNICATION DEVICE AND HAC MODULE THEREOF

(75) Inventors: Chang-Hsin Kuo, Tu-Cheng (TW); Chia-Ming Liang, Tu-Cheng (TW); Shih-Tsung Kan, Tu-Cheng (TW); Che-Yen Lin, Tu-Cheng (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 233 days.

(21) Appl. No.: 13/149,794

(22) Filed: May 31, 2011

(65) Prior Publication Data

US 2012/0148076 A1 Jun. 14, 2012

(30) Foreign Application Priority Data

Dec. 14, 2010 (TW) ............................... 99143831 A

(51) Int. Cl.
*H04R 25/00* (2006.01)

(52) U.S. Cl.
USPC ........................... 381/324; 381/314; 381/315

(58) Field of Classification Search
USPC ................ 381/317, 189, 314–315, 322, 324; 343/700 MS, 702; 361/816; 455/41.1
See application file for complete search history.

(56) References Cited

U.S. PATENT DOCUMENTS

| 2009/0243944 | A1* | 10/2009 | Jung et al. | 343/702 |
| 2010/0109953 | A1* | 5/2010 | Tang | 343/700 MS |
| 2010/0164808 | A1* | 7/2010 | Chang et al. | 343/700 MS |

\* cited by examiner

*Primary Examiner* — Suhan Ni
(74) *Attorney, Agent, or Firm* — Altis & Wispro Law Group, Inc.

(57) ABSTRACT

An exemplary hearing aid compatibility (HAC) module includes an insulative substrate and a ground member. The substrate includes a first mounting surface, and a second mounting surface at opposite sides thereof, and a third mounting surface between the first mounting surface and the second mounting surface. The ground member includes two ground portions respectively attached to the first mounting surface and the second mounting surface, and a connecting portion attached to the third mounting surface. The connecting portion comprises two or more parts. One of the parts connects one of the ground portions, and another of the parts connects the other ground portion.

16 Claims, 7 Drawing Sheets

| Category | Electric field emission limits (dBV/m) | Magnetic field emission limits (dBA/m) |
|---|---|---|
| M1/T1 | 43.5-48.5 | -6.9--1.9 |
| M2/T2 | 38.5-4.35 | -11.9--6.9 |
| M3/T3 | 33.5-38.5 | -16.9--11.9 |
| M4/T4 | <33.5 | <-16.9 |

FIG. 7
(RELATED ART)

WIRELESS COMMUNICATION DEVICE AND HAC MODULE THEREOF

BACKGROUND

1. Technical Field

The disclosure generally relates to wireless communication devices, and particularly to a wireless communication device compatible with hearing aids.

2. Description of Related Art

In general, a hearing aid operates by using a microphone to pick up sound waves in the air and then converting the sound waves to electrical signals. The signals are then amplified as needed and converted back to audible sounds for the user. The hearing aid microphone, however, does not always work well in conjunction with audio devices such as mobile phones.

Mobile phones are often incompatible with hearing aids due to the potential for radio frequency (RF) interference in the form of scattered EM (electromagnetic) fields generated by the mobile phone while in use. When a mobile phone is in communication with its network, an electromagnetic field is present around the mobile phone. When the mobile phone is in use, the electromagnetic field generates pulses. It is this pulsing energy that may be picked up by the hearing aid's microphone, and heard as a buzzing sound (i.e., interference) by the user.

To deal with this situation, the United States Federal Communications Commission (FCC) has promulgated a hearing aid compatibility (HAC) standard to evaluate the interference intensity between a mobile phone and a hearing aid.

Referring to FIG. 7, the FCC defines HAC for mobile phones in terms of two parameters; radio-frequency (RF) emissions (M-scale) and telecoil coupling (T-scale). The M rating relates to the strength of the RF emissions from a mobile phone. The higher the M rating the mobile phone has, the lower the strength of the RF emissions, and the higher the quality of audio in the hearing aid. The T rating relates to a mobile phone's coupling ability. The higher the T rating awarded to the mobile phone, the more likely users will be able to use that mobile phone with the hearing aid.

In addition, to obtain a better transmission and reception capability, some mobile phones have a higher total radiated power (TRP). However, the M rating of the mobile phone may be reduced when the TRP is too high, and the mobile phone may be evaluated as incompatible with the hearing aid.

Therefore, there is room for improvement within the art.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

FIG. 7 is a table of electric and magnetic field M ratings and T ratings for the FCC HAC standards.

DETAILED DESCRIPTION

Figure 1:
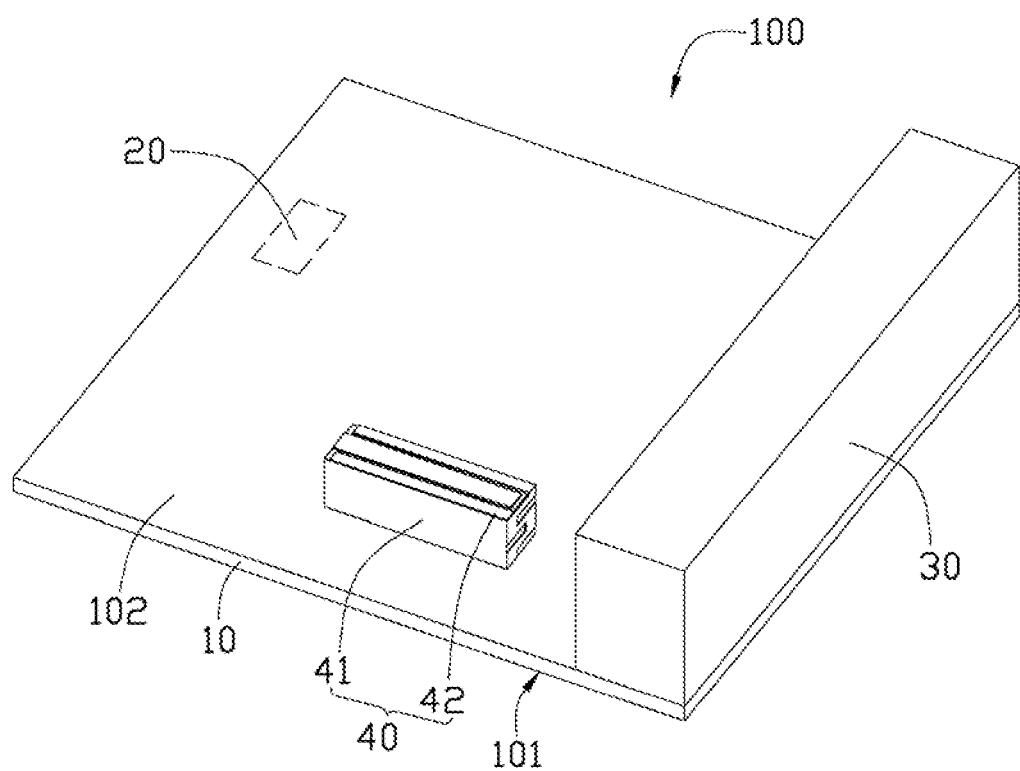
FIG. 1 is a schematic view of a right side of wireless communication device, according to an exemplary embodiment.

FIG. 1 shows a wireless communication device 100, according to an exemplary embodiment. The wireless communication device 100 includes a circuit board 10, a receiver 20 (schematically shown), an antenna module 30 (schematically shown), and a hearing aid compatibility (HAC) module 40.

The circuit board 10 includes a first surface 101 and a second surface 102 on opposite sides thereof. The second surface 102 is on a reverse side of the circuit board 10. The receiver 20 may be a speaker or an earphone. The receiver 20 is mounted on the first surface 101. The antenna module 30 is mounted on the second surface 102.

Figure 2:
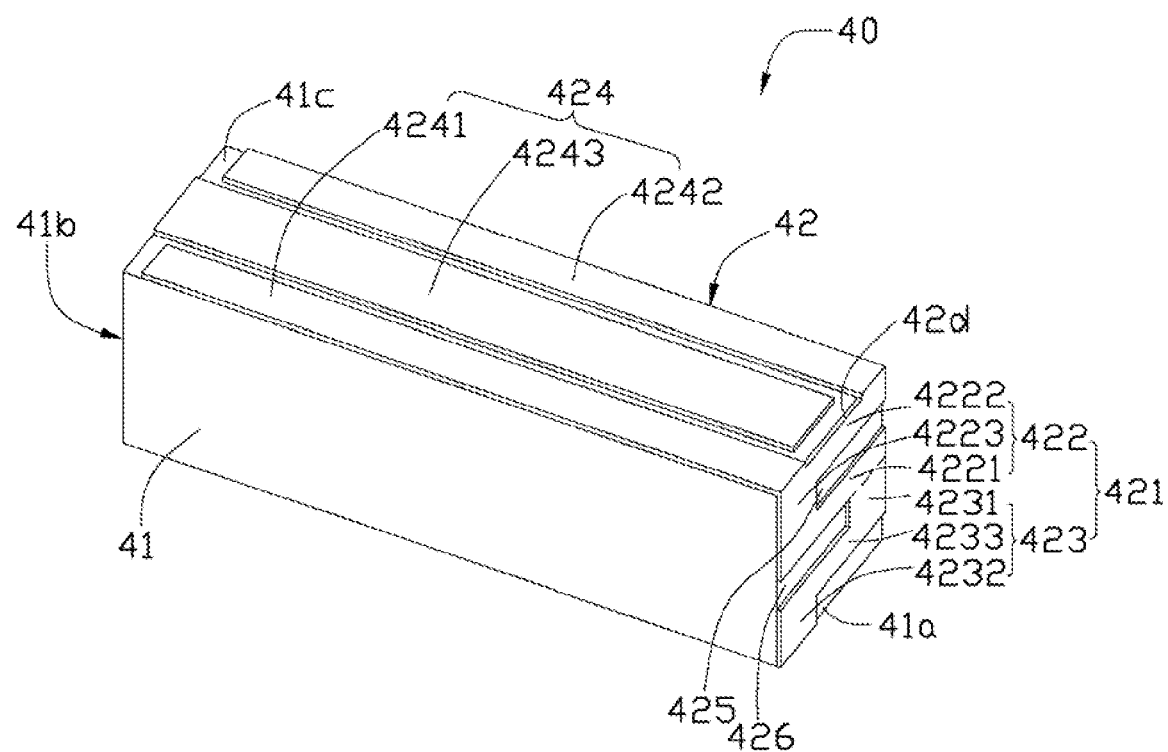
FIG. 2 is a schematic view of a HAC module of the wireless communication device of FIG. 1.
Figure 3:
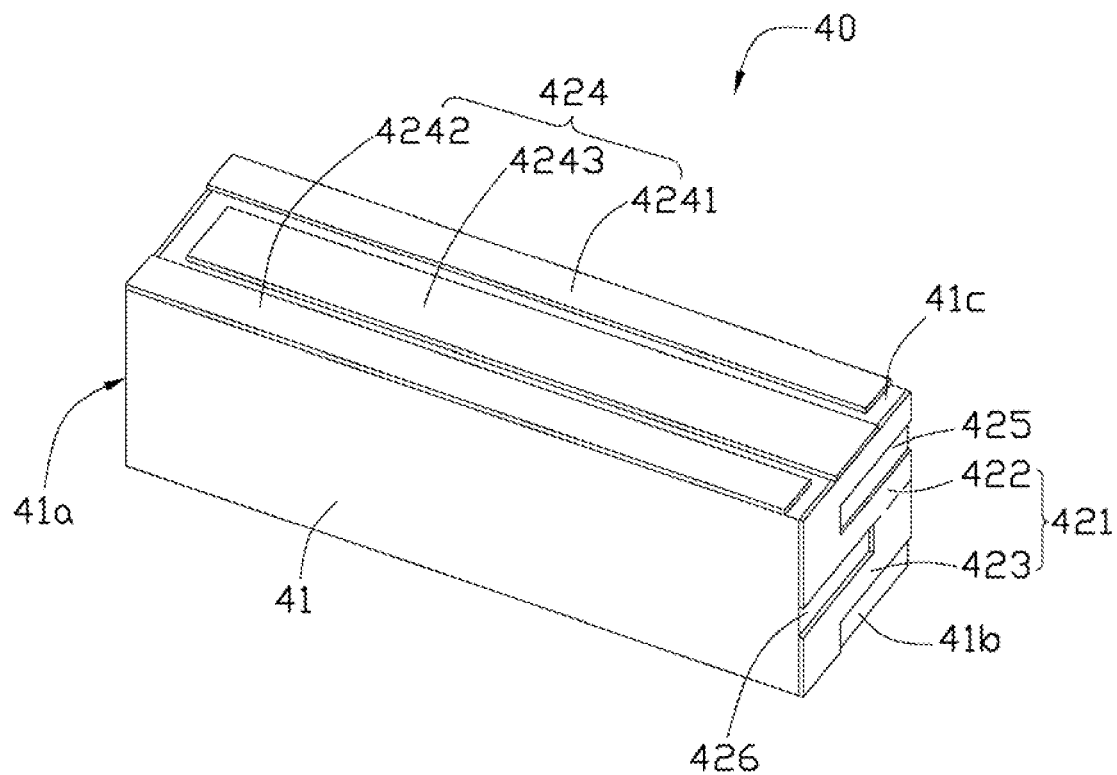
FIG. 3 is similar to FIG. 2, but showing the HAC module in another aspect.

Referring to FIGS. 2 and 3, the HAC module 40 is mounted on the second surface 102. The HAC module 40 includes a substrate 41, and a ground member 42 attached to the substrate 41.

The substrate 41 is substantially an insulator, for mounting of the ground member 42 thereon. The substrate 41 includes a first mounting surface 41a, a second mounting surface 41b, and a third mounting surface 41c. The first mounting surface 41a and the second mounting surface 41b are at opposite ends of the substrate 41, and are parallel to each other. The third mounting surface 41c perpendicularly interconnects the first mounting surface 41a and the second mounting surface 41b.

The ground member 42 is made of metal. The ground member 42 includes two ground portions 421, and a connecting portion 424 connecting the two ground portions 421. The two ground portions 421 are respectively attached to the first mounting surface 41a and the second mounting surface 41b. The two ground portions 421 are rotationally symmetric with respect to each other. That is, if either ground portion 421 is rotated 180° about a center axis (not labeled) of the substrate 41, then it becomes identical to the other ground portion 421. The connecting portion 424 is attached to the third mounting surface 41c.

Each ground portion 421 is substantially a rectilinear sheet including a first rectilinear part 422 and a second rectilinear part 423 connected to the first rectilinear part 422. The first rectilinear part 422 is substantially U-shaped. The second rectilinear part 423 is substantially Z-shaped. Considered another way, the ground portion 421 is in the form of a flat plate having a square-wave shape.

The first rectilinear part 422 includes a first arm section 4221, a second arm section 4222, and a first main section 4223. The first arm section 4221 and the second arm section 4222 are respectively connected perpendicularly to two ends of the same side of the first main section 4223. A first gap 425 is formed between the first arm section 4221 and the second arm section 4222.

The second rectilinear part 423 includes a first end section 4231, a second end section 4232, and a second main section 4233. The first end section 4231 and the second end section 4232 are respectively connected perpendicularly to two ends of two opposite sides of the second main section 4233. The first end section 4231 is connected to an end of the second arm section 4222. The second main section 4233 is parallel to the first arm section 4221. A second gap 246 is formed between the second main section 4233 and the first arm section 4221.

The connecting portion 424 includes a first connecting strip 4241, a second connecting strip 4242 and a third connecting strip 4243. The first connecting strip 4241, the second connecting strip 4242, and the third connecting strip 4243 are almost the same length. The first connecting strip 4241 and the second connecting strip 4242 have the same transverse width, which is slightly smaller than that of the third connecting section 4243.

The first connecting strip 4241 and the second connecting strip 4242 are respectively attached to two opposite long sides of the third surface 41c. The first connecting strip 4241 and the second connecting strip 4242 are parallel to and generally opposite each other. The third connecting strip 4243 is attached to the third surface 41c between the first connecting strip 4241 and the second connecting strip 4242. Same ends of the first connecting strip 4241 and the second connecting strip 4242 are connected to one long side of the second arm section 4222 attached to the first mounting surface 41a. One end of the third connecting strip 4243 is connected one long side of the second arm section 4222 attached to the second mounting surface 41b.

Figure 4:
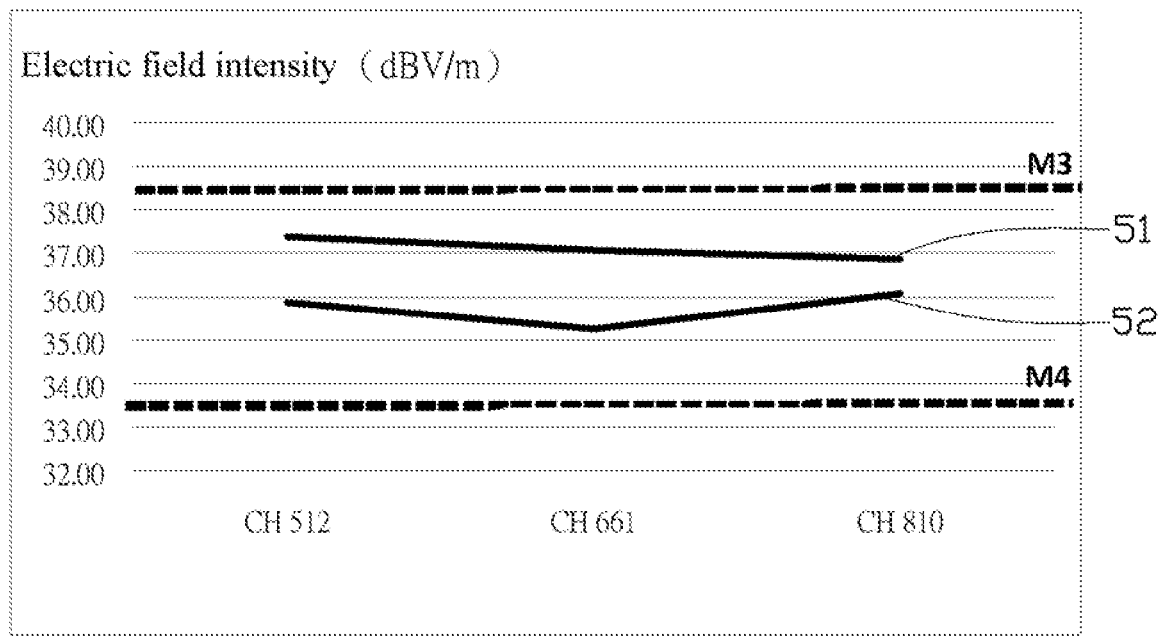
FIG. 4 is a diagram showing two different measurements of the electric field intensities of a receiver of the wireless communication device: when the wireless communication device is mounted with the HAC module, and when the wireless communication device is without the HAC module.
Figure 5:
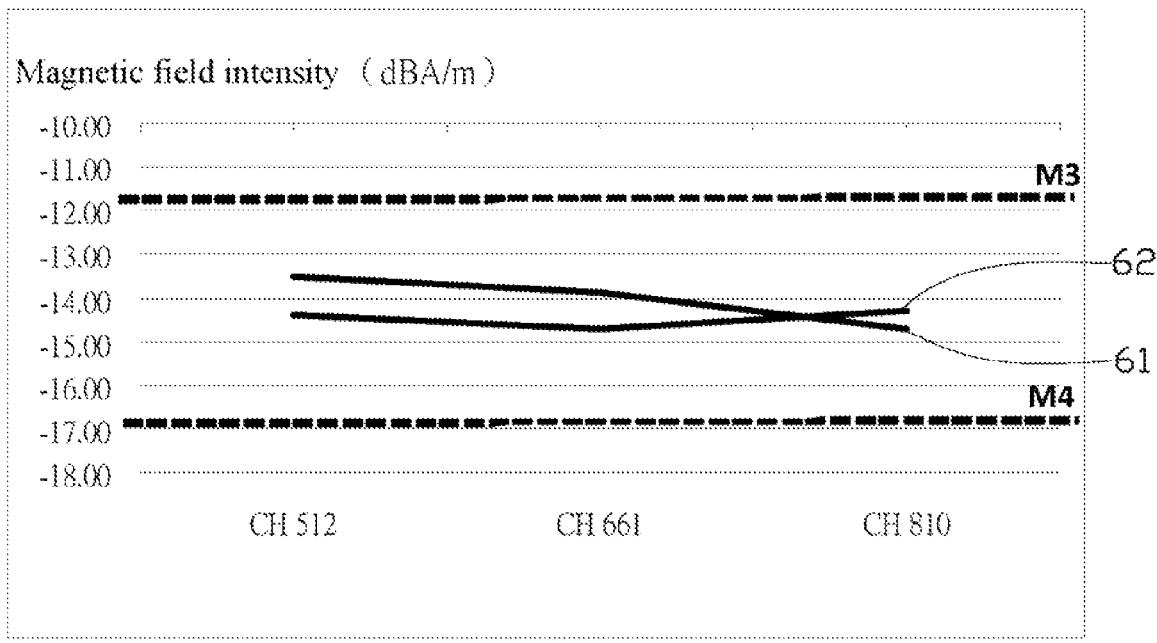
FIG. 5 is a diagram showing two different measurements of the magnetic field intensities of the receiver of the wireless communication device: when the wireless communication device is mounted with the HAC module, and when the wireless communication device is without the HAC module.

In use, free ends of the two second end sections 4232 are connected to the circuit board 10. Thus, the HAC module 40 reduces the electronic and magnetic fields around the receiver 20. Referring to FIG. 4, line 51 denotes the intensity of the electric field around the receiver 20 of the wireless communication device 100 without the HAC module 40. Line 52 denotes the intensity of the electric field around the receiver 20 of the wireless communication device 100 with the HAC module 40. Referring to FIG. 5, line 61 denotes the intensity of the magnetic field around the receiver 20 of the wireless communication device 100 without the HAC module 40. Line 62 denotes the intensity of the magnetic field around the receiver 20 of the wireless communication device 100 with the HAC module 40. As shown in experiments, the electric and magnetic field intensities of the wireless communication device 100 are effectively reduced to approach the M4-rating thresholds, and thereby meet the HAC standard. Therefore, with the benefit of the HAC module 40, the wireless communication device 100 is more compatible with hearing aids.

Figure 6:
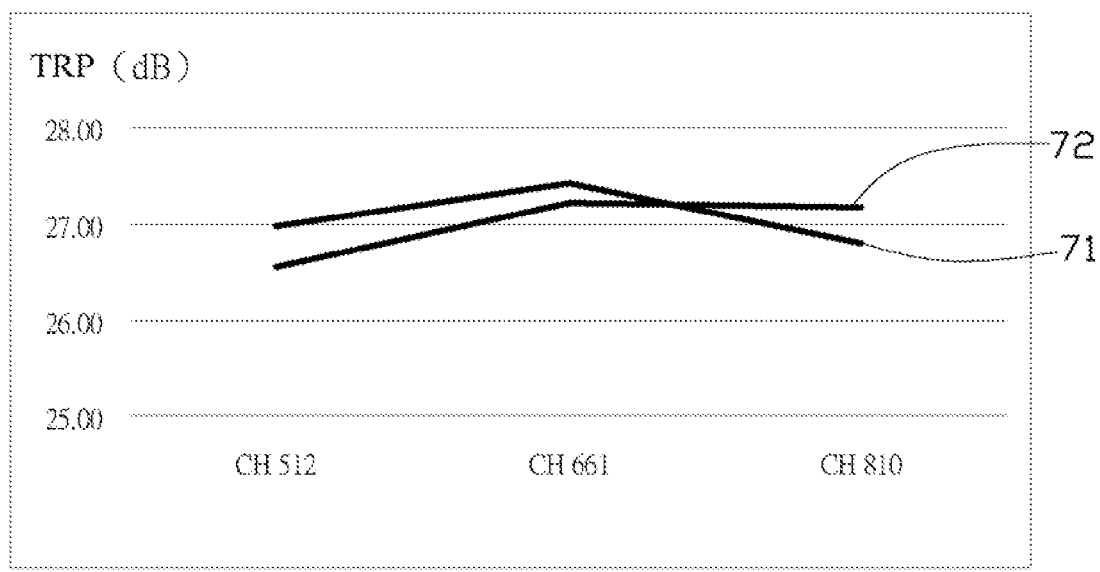
FIG. 6 is a diagram showing two different measurements of the TRP of the wireless communication device: when the wireless communication device is mounted with the HAC module, and when the wireless communication device is without the HAC module.

In addition, referring to FIG. 6, line 71 denotes the TRP of the wireless communication device 100 without a HAC module 40. Line 72 denotes the TRP of the wireless communication device 100 with the HAC module 40. As seen, the TRP of the wireless communication device 100 remains high even with the presence of the HAC module 40. Thus the wireless communication device 100 can have excellent transmitting and receiving capabilities.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A hearing aid compatibility (HAC) module, comprising:
an insulative substrate including a first mounting surface and a second mounting surface at opposite sides thereof, and a third mounting surface between the first mounting surface and the second mounting surface; and
a ground member including two ground portions respectively attached to the first mounting surface and the second mounting surface, and a connecting portion attached to the third mounting surface, the connecting portion comprising at least two parts, one of the at least two parts connecting one of the ground portions, and another of the at least two parts connecting the other ground portion; wherein the two ground portions are rotationally symmetric with respect to each other, if either ground portion is rotated 180 degrees about a center axis of the substrate, then it becomes identical to the other ground portion.

2. The HAC module of claim 1, wherein each of the ground portions includes a generally U-shaped rectilinear part and a generally Z-shaped rectilinear part connected to the U-shaped rectilinear part.

3. The HAC module of claim 2, wherein the U-shaped rectilinear part includes a first arm section, a second arm section, and a first main section, and the first arm section and the second arm section are respectively connected perpendicularly to two ends of the same side of the first main section.

4. The HAC module of claim 3, wherein the Z-shaped rectilinear part includes a first end section, a second end section, and a second main section, the first end section and the second end section are respectively connected perpendicularly to two ends of two opposite sides of the second main section.

5. The HAC module of claim 4, wherein the first end section is also connected to an end of the first arm section, and the second main section is parallel to the first arm section.

6. The HAC module of claim 5, wherein the at least two parts of the connecting portion comprise a first connecting strip, a second connecting strip and a third connecting strip, the first and second connecting strips are respectively attached to two opposite sides of the third mounting surface, and the third connecting strip is attached to a middle portion of the third mounting surface between the first connecting strip and the second connecting strip.

7. The HAC module of claim 6, wherein same ends of the first and second connecting strips are connected one long side of the second arm section attached to the first mounting surface, one end of the third connecting strip is connected one long side of the second arm section attached to the second mounting surface.

8. A wireless communication device, comprising:
a circuit board including a first surface and a second surface at opposite sides thereof;
a receiver mounted on the first surface;
an antenna module mounted on the second surface; and
a hearing aid compatibility (HAC) module mounted on the second surface to reduce electric and magnetic fields in the vicinity of the receiver, the HAC module comprising:
a substrate including a first mounting surface and a second mounting surface at opposite sides thereof, and a third mounting surface between the first mounting surface and the second mounting surface; and
a ground member including two ground portions respectively attached to the first mounting surface and the second mounting surface, and a connecting portion attached to the third mounting surface, the connecting portion comprising at least two parts, one of the at least two parts connecting one of the ground portions, and another of the at least two parts connecting the other ground portion; wherein the two ground portions are rotationally symmetric with respect to each other, if either ground portion is rotated 180 degrees about a center axis of the substrate, then it becomes identical to the other ground portion.

9. The wireless communication device of claim 8, wherein each ground portion includes a generally U-shaped rectilinear part and a generally Z-shaped rectilinear part connected to the U-shaped rectilinear part.

10. The wireless communication device of claim 9, wherein the U-shaped rectilinear part includes a first arm section, a second arm section, and a first main section, the first arm section and the second arm section are respectively connected perpendicular to two ends of the same side of the first main section.

11. The wireless communication device of claim 10, wherein the Z-shaped rectilinear part includes a first end section, a second end section, and a second main section, the first end section and the second end section are respectively connected perpendicularly to two ends of two opposite sides of the second main section.

12. The wireless communication device of claim 11, wherein the first end section is connected to an end of the first arm section, and the second main section is parallel to the first arm section.

13. The wireless communication device of claim 12, wherein the at least two parts of the connecting portion comprise a first connecting strip, a second connecting strip and a third connecting strip, the first and second connecting strips are respectively attached to two opposite sides of the third mounting surface, and the third connecting strip is attached to a middle portion of the third mounting surface between the first connecting strip and the second connecting strip.

14. The wireless communication device of claim 13, wherein same ends of the first and second connecting strips are connected one long side of the second arm section attached to the first mounting surface, one end of the third connecting strip is connected one long side of the second arm section attached to the second mounting surface.

15. A hearing aid compatibility (HAC) module, comprising:
an electrically insulative substrate including a first mounting surface and a second mounting surface at opposite ends thereof, and an elongated third mounting surface between the first mounting surface and the second mounting surface; and
a metallic ground member including two ground portions and a connecting portion, the ground portions attached to the first mounting surface and the second mounting surface, respectively, and being rotationally symmetric with respect to each other, if either ground portion is rotated 180 degrees about a center axis of the substrate, then it becomes identical to the other ground portion, the connecting portion attached to the third mounting surface, the connecting portion comprising three parallel elongated strips, two outer of the three elongated strips connected to one of the ground portions, and the other intermediate one of the three elongated strips connected to the other ground portion.

16. The HAC module of claim 15, wherein each of ground portions is in the form of a flat plate having a square-wave shape.

* * * * *